United States Patent [19]
Cullen et al.

[11] Patent Number: 5,479,898
[45] Date of Patent: Jan. 2, 1996

[54] METHOD AND APPARATUS FOR CONTROLLING ENGINE TORQUE

[75] Inventors: Michael J. Cullen, Northville; Louis R. Christensen, Canton; Peter J. Grutter, Plymouth; Michael A. Weyburne, Northville, all of Mich.; Joseph N. Ulrey, Hiroshima, Japan; David G. Farmer, Plymouth, Mich.

[73] Assignee: Ford Motor Company, Dearborn, Mich.

[21] Appl. No.: 270,963

[22] Filed: Jul. 5, 1994

[51] Int. Cl.$^6$ .................................................. F02D 41/00
[52] U.S. Cl. ..................................... 123/350; 364/431.07
[58] Field of Search .................................. 123/350, 349, 123/352, 361, 340; 73/117.3; 477/110; 364/426.04, 431.07; 60/277

[56] References Cited

U.S. PATENT DOCUMENTS

| | | | |
|---|---|---|---|
| 4,853,720 | 8/1989 | Onari et al. | 364/431.07 |
| 5,078,109 | 1/1992 | Yoshida et al. | 123/350 |
| 5,190,017 | 3/1993 | Cullen et al. | 123/571 |
| 5,241,855 | 9/1993 | Cullen et al. | 73/117.3 |
| 5,333,109 | 7/1994 | Oo et al. | 364/426.04 |
| 5,391,127 | 2/1995 | Nishimura | 477/110 |

*Primary Examiner*—Raymond A. Nelli
*Attorney, Agent, or Firm*—Allan J. Lippa; Roger L. May

[57] ABSTRACT

A method for reducing the engine torque being produced by an internal combustion engine to a desired engine torque through coordinated control of spark retard, cylinder cut-out and air/fuel scheduling. The method is for use with a vehicle including a multi-cylinder internal combustion engine capable of generating torque, each cylinder having an associated fuel injector for providing fuel to the cylinder and an associated spark timing control for providing a spark for combustion of the fuel with fresh air during engine operation. The method includes identifying the desired engine torque to which the engine torque being produced is to be reduced, and determining a first torque reduction to be achieved by defueling at least one of the engine cylinders. The method also includes determining a second torque reduction to be achieved by lean air/fuel scheduling, the second torque reduction being adjusted for the number of cylinders defueled, and determining a third torque reduction to be achieved by spark retardation, the third torque reduction being adjusted for the number of cylinders defueled and for the lean air/fuel scheduling.

17 Claims, 6 Drawing Sheets

5,479,898

METHOD AND APPARATUS FOR CONTROLLING ENGINE TORQUE

TECHNICAL FIELD

The present invention relates to a method and apparatus for controlling internal combustion engine torque to a desired torque value during vehicle operation.

BACKGROUND ART

Generally, it is desirable to be able to control internal combustion engine torque during vehicle operation. Various reasons exist for reducing the amount of engine (brake) torque generated. For example, there may be a need for a reduction of engine torque for traction control or anti-spin control purposes. Furthermore, engine torque may need to be reduced in order to protect certain vehicle components.

In addition to being able to determine how much engine torque should be reduced, it is also desirable to identify and implement the appropriate control actions required to reduce the torque to the desired torque in an acceptable period of time. For example, controlling the amount of air delivered to the engine for combustion purposes is generally a slower process than controlling spark advance. Although existing strategies have utilized spark retard and/or cylinder cutoff to reduce torque, the prior art has yet to teach the coordinated control of the present invention.

There is, therefore, a need to develop a strategy for controlling the amount of net engine torque produced by an internal combustion engine utilizing coordinated torque reduction control operations.

SUMMARY OF THE INVENTION

It is an object of the present invention to provide a method and system for controlling the amount of engine torque produced by an internal combustion engine through coordinated management of various control actions.

In carrying out the above object and other objects and features of the present invention, there is provided a method, for use with a vehicle including a multi-cylinder internal combustion engine capable of generating torque, each cylinder having an associated fuel injector for providing fuel to the cylinder and an associated spark plug for providing a spark for combustion of the fuel with fresh air during engine operation, for reducing the engine torque being produced to a desired engine torque. The method comprises identifying the desired engine torque to which the engine torque being produced is to be reduced, and determining a first torque reduction to be achieved by defueling at least one of the engine cylinders. The method also comprises determining a second torque reduction to be achieved by lean air/fuel scheduling, the second torque reduction being adjusted for the number of cylinders defueled, and determining a third torque reduction to be achieved by spark retard, the third torque reduction being adjusted for the number of cylinders defueled and for the lean air/fuel scheduling, the first, second and third torque reductions being implemented so as to reduce the engine torque being produced to the desired engine torque.

A system is also provided for carrying out the method.

The advantages accruing to the present invention are numerous. For example, various control operations are closely coordinated to obtain a desired engine torque, with little calibration effort due to the algorithmic nature of strategy. The strategy implements control operations for quick and significant reductions in torque, and control operations for producing a continuum of smaller torque changes between large torque changes resulting from the quick and significant reductions in torque. The result is smooth torque transitions which enhance customer satisfaction and driveability.

The above object and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
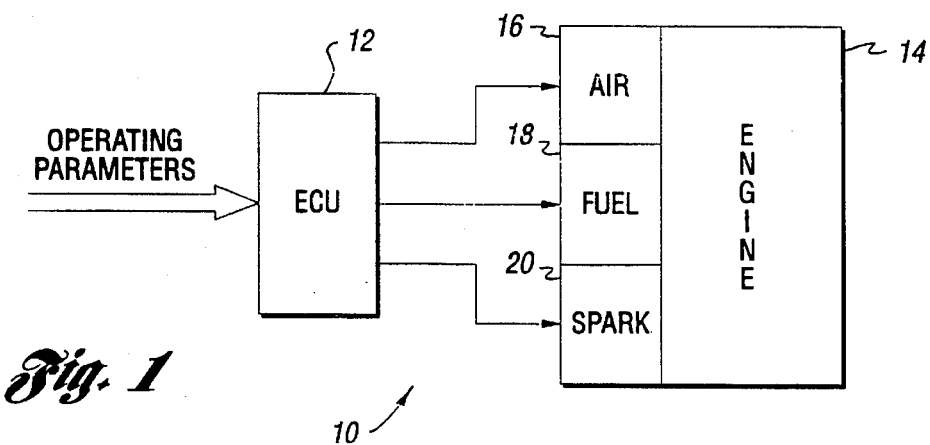
FIG. 1 is a block diagram representation of a system for controlling engine torque according to the present invention.

Referring now to FIG. 1, there is shown a block diagram representation of a vehicle system, shown generally by reference numeral 10, including an electronic control unit (ECU) 12 including a microprocessor for controlling a spark-ignited internal combustion engine 14. The engine 14 includes well-known fresh air intake 16 hardware, a plurality of fuel injectors shown generally by reference numeral 18, and a plurality of spark plugs shown generally by reference numeral 20. Preferably, the system operates according to the present invention to control the net engine torque produced by the engine 14 to a desired torque.

As is known, the microprocessor has both volatile and non-volatile memories, such as a keep-alive memory and ROM, associated therewith. The ECU 12 could also include additional memories separate from and external to the microprocessor. During vehicle operation, the microprocessor executes software typically stored in non-volatile memory, continually gathering in a real-time fashion a plurality of vehicle and engine operating parameters from well-known sensors (not specifically illustrated for the sake of clarity) for purposes of vehicle and engine control. These parameters include, but are not limited to, mass air flow, engine speed, coolant temperature, exhaust gas oxygen, vehicle speed, and throttle position.

Utilizing the sensed data, the microprocessor controls various aspects of both vehicle and engine operation. As shown, the microprocessor controls the air/fuel (A/F) scheduling, the fuel delivery, and the spark advance. For A/F scheduling, the microprocessor controls the amount of fresh air delivered to the individual cylinders of the engine 14. For fuel delivery, the microprocessor controls the plurality of engine fuel injectors through a like plurality of standard fuel injector driver circuits. The associated fuel injectors provide fuel to the combustion cylinders in terms of a pulse width determined by the microprocessor based on the operating parameters. For spark, the microprocessor controls the amount of spark retard/advance.

According to the present invention, there are various requesters for reducing the current engine or brake torque, the lowest of which is granted and becomes the desired engine torque. The desired engine torque is preferably converted into an indicated torque (i.e. brake torque plus friction torque) by adding in the torque losses and then determining a ratio of desired indicated torque over current indicated torque. This ratio is then used to determine the appropriate control action.

The preferred embodiment utilizes three control operations to effect a torque reduction. These operations are spark retard, A/F scheduling, and fuel injector cutout. Generally, smaller torque reduction requests are handled by spark retard. For larger reduction requests, a particular control priority, such as one of injector cutout, A/F scheduling, and spark retard may be implemented.

When the inferred catalyst temperature indicates an over-temperature condition (e.g. such as during a torque reduction event), spark retard is precluded as a possible control operation by the torque control strategy, due to the relationship between retarding of spark and temperature. Furthermore, a minimum number of cylinders may be disabled for cooling purposes if one of the appropriate conditions are met: e.g., if the A/F is lean (some cylinders off), and the catalyst midbed temperature is above the lean maximum midbed temperature, or if the A/F is rich/stoic (cylinders are on) the A/F controller is at its rich limit, and the catalyst midbed temperature is above the rich maximum midbed temperature.

Figure 2:
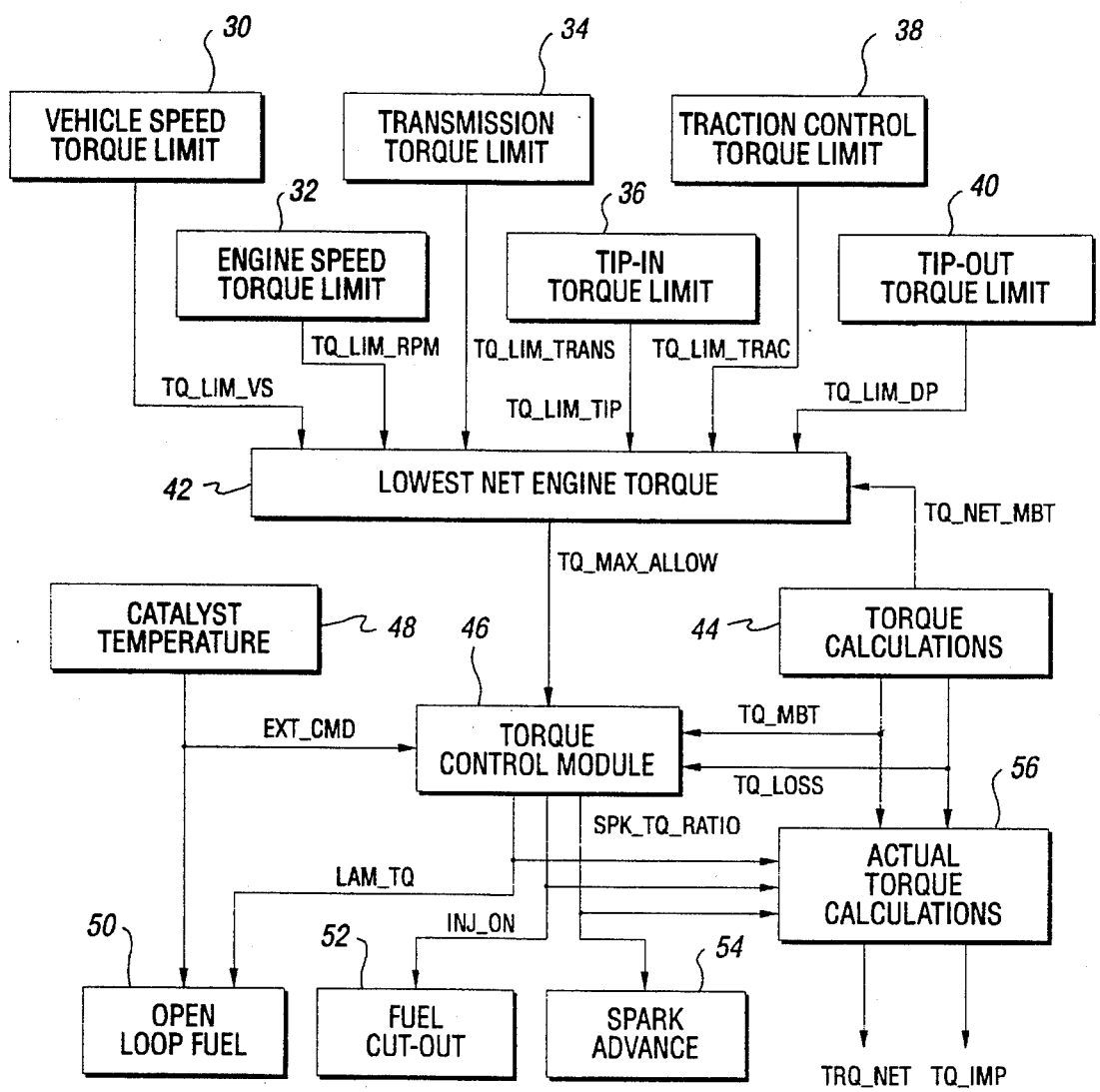
FIG. 2 is a block diagram illustrating the relationship between the various modules of the torque control strategy of the present invention.

Referring now to FIG. 2, there is shown a block diagram for torque control according to the present invention. As previously noted, there may be various reasons to limit current brake torque. As such, the ECU 12 implements various brake torque reducing requesters, such as a vehicle speed torque limit (VSTL) 30, an engine speed torque limit (ESTL) 32, a transmission torque limit (TTL) 34, a tip-in torque limit (TITL) 36, a traction control torque limit (TCTL) 38, and a tip-out torque limit (TOTL) 40. The VSTL 30 and ESTL 32 function to limit vehicle speed and engine speed, respectively. The TTL operates to prevent damage to the transmission, and the TCTL operates in conjunction with a traction control strategy to control the relative slip between the vehicle wheels and the road surface. The TITL and TOTL limit the rate of torque increase and/or decrease during tip-in and tip-out so as to reduce powertrain windup and impact caused by drivetrain lash.

With continuing reference to FIG. 2, block 42 determines the lowest requested net engine torque based on the various maximum net engine torques allowed by vehicle speed limiting, engine speed limiting, tip-in and tip-out torque control, traction control and transmission strategy described above, as well as the maximum net torque that could be produced by the engine (TQ_NET_MBT), which is generated by block 44. Generally, the lowest net torque calculation performs comparisons between the various maximum net engine torques to obtain the lowest torque requested. The various torque reduction requesters and the lowest torque calculation block 42 are also described in U.S. patent application Ser. No. 08/057,920, filed on May 7, 1993, titled "Torque Managed Traction Control for the Drive Wheels of an Automotive Vehicle", assigned to the assignee of the present invention, the specification of which is hereby expressly incorporated by reference in its entirety.

As best shown in FIG. 2, the output of block 42 is the maximum torque allowable (TQ_MAX_ALLOW), which is provided to a torque control module block 46. The torque control module block 46 also receives as input a signed inferred catalyst midbed temperature (EXT_CMD) from a catalyst temperature model block 48, TQ_MBT, and TQ_LOSS from block 44.

A detailed description of the determination of the catalyst midbed temperature can be found in U.S. Pat. No. 5,190,017, and U.S. patent application Ser. No. 08/196,735, filed on Feb. 15, 1994, titled "Method and Apparatus To Limit A Midbed Temperature of a Catalytic Converter", both of which are assigned to the assignee of the present invention, the specifications of which are hereby expressly incorporated by reference in their entirety. Generally, block 44 calculates the maximum brake torque available at the engine output at a stoichiometric A/F ratio utilizing a base torque value modified for accessory loads and engine friction. A detailed description of the determination of TQ_MBT and TQ_LOSS can be found in U.S. Pat. No. 5,241,855, titled "Method and Apparatus for Inferring Engine Torque", assigned to the assignee of the present invention, the specification of which is hereby expressly incorporated by reference in its entirety.

As shown in FIG. 2, the outputs of torque control module 46, LAM_TQ (A/F ratio), INJ_ON (the number of fuel injectors to be energized), and SPK_TQ_RATIO (the torque ratio to be obtained by retarding spark) are generated and utilized for torque control via an open loop fuel control action at block 50, a fuel cut-out control action at block 52, and a spark advance control action at block 54 as described in greater detail hereinbelow.

Figure 3A:
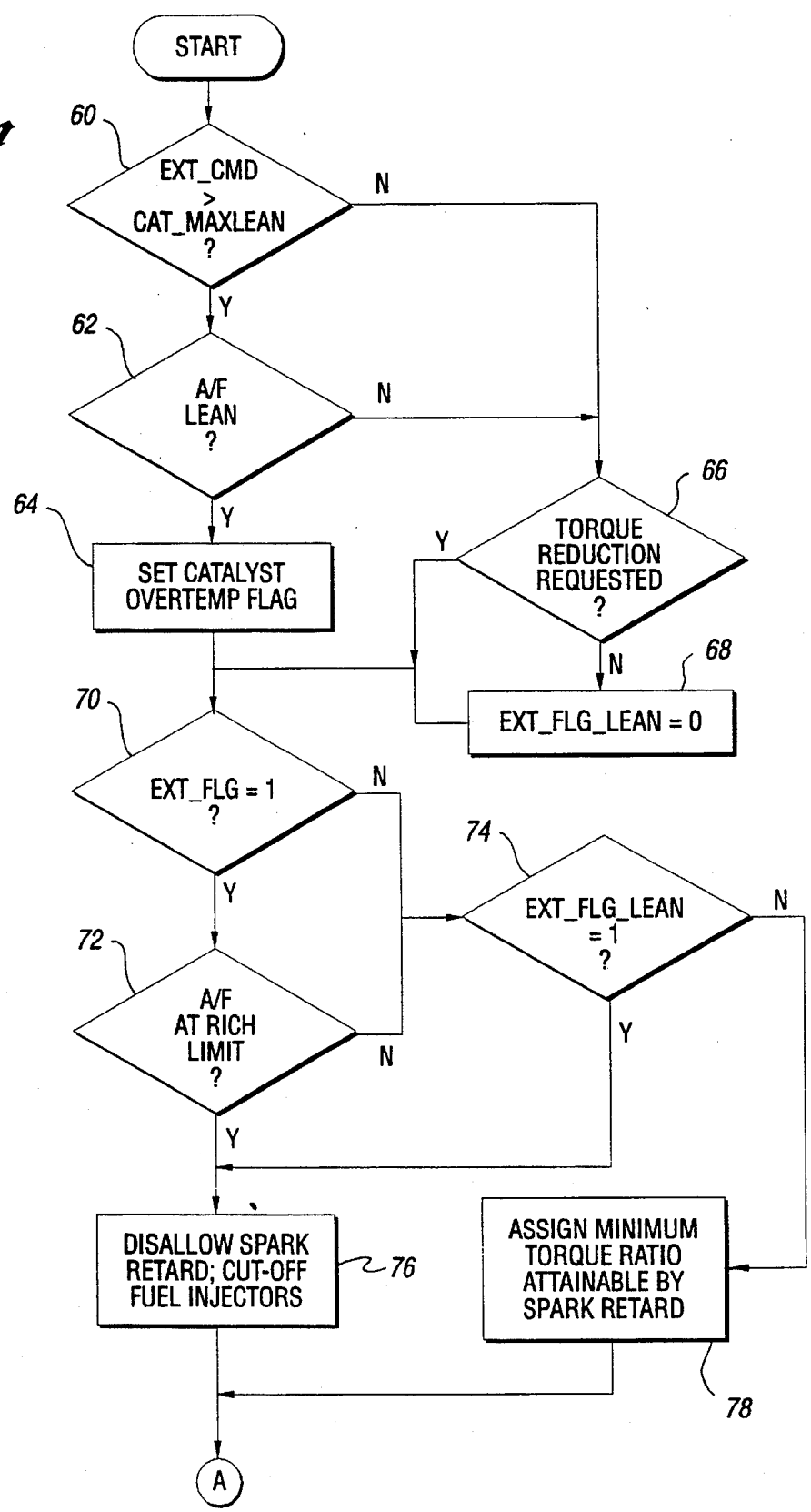
FIGS. 3a–3c are a flowchart detailing the methodology for torque control according to the present invention.
Figure 3B:
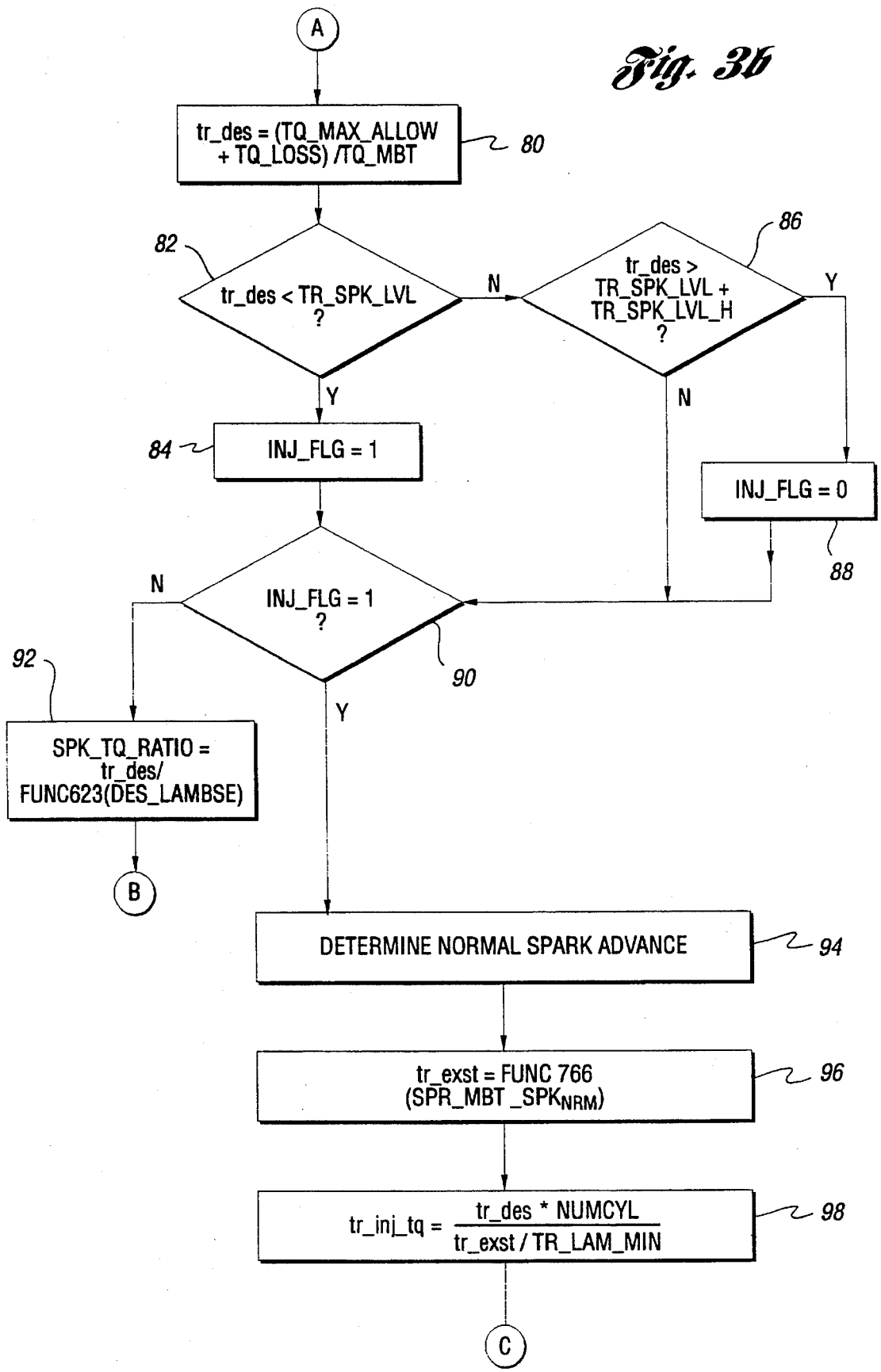
Figure 3C:
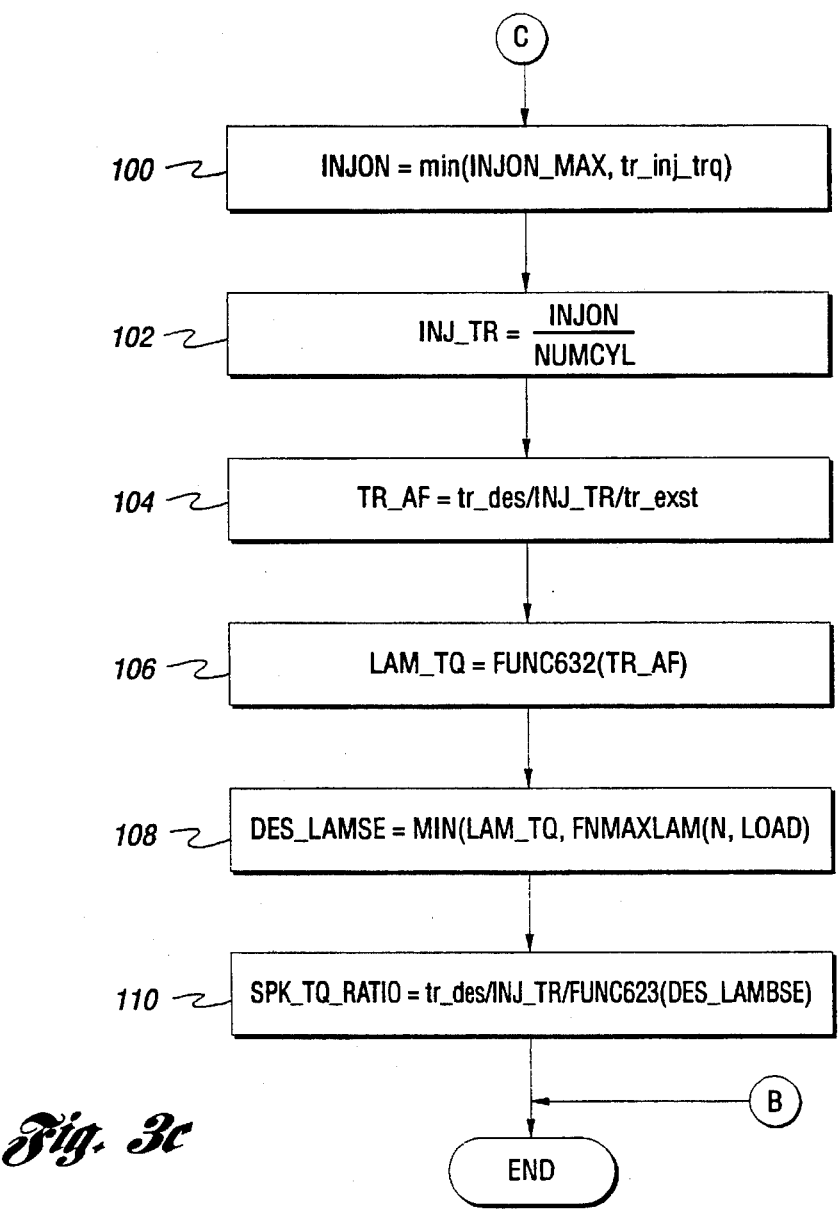

Referring now to FIGS. 3a–3c, there is shown a flowchart detailing the steps for torque control according to the present invention. At step 60 of FIG. 3a, the ECU 12 compares the catalyst midbed temperature to CAT_MAXLEAN, the variable representing the catalyst midbed temperature limit for prohibiting torque control spark retard reductions during lean A/F scheduling. If there is a midbed over-temperature, at step 62 the ECU determines whether the A/F is lean, such as based on the value of DES_LAMBSE, the desired A/F. If the A/F is lean, at step 64 a flag indicating a catalyst midbed over-temperature if A/F lean (EXT_FLG_LEAN) is set. If there is no midbed over-temperature (step 60), or if the A/F is not lean (step 62), the ECU determines if there has been a torque reduction request at step 66. If there is no torque reduction request, the flag is cleared at step 68.

With continuing reference to FIG. 3a, at step 70 the ECU checks the state of the EXT_FLG, a flag the state of which indicates rich A/F and a catalyst exhaust midbed over-temperature flag. A state of '1' indicates a rich A/F and catalyst midbed temperature under A/F control. If an over-temperature condition exists (EXT_FLG=1), at step 72 the ECU determines whether the A/F ratio is at the rich limit, such as by comparing the value of DES_LAMBSE to LAM_EXT_MIN, the variable representing the lowest LAMBSE the open-loop A/F controller will utilize to control catalyst temperatures. If DES_LAMBSE is at the rich limit, then the catalyst midbed temperature is presumed to be at or over the control limit. If either of the conditions tested at steps 70 and 72 fail, control flow proceeds to step 74, at which the state of the EXT_FLG_LEAN flag is checked. A state of '1' indicates a catalyst midbed over-temperature with a lean A/F.

If control flow reaches step 76, there is an over-temperature condition which precludes the use of spark retard for achieving the desired reduction in engine torque. Accordingly, at step 76 spark retard is disallowed, and fuel is cut from the fuel injectors. More particularly, at least one fuel injector per bank is turned off for cooling in the event a catalyst over-temperature condition exists. If there is no over-temperature condition, at step 78 the minimum torque ratio (TR_SPK_LVL) attainable by spark retard only is assigned utilizing a function which determines the maximum amount of spark reduction (in terms of a torque ratio) that can be used before cylinder cutout and A/F scheduling are utilized. The maximum amount of spark reduction is preferably determined based on the source of the torque reduction request (TQ_SOURCE).

Figure 4:
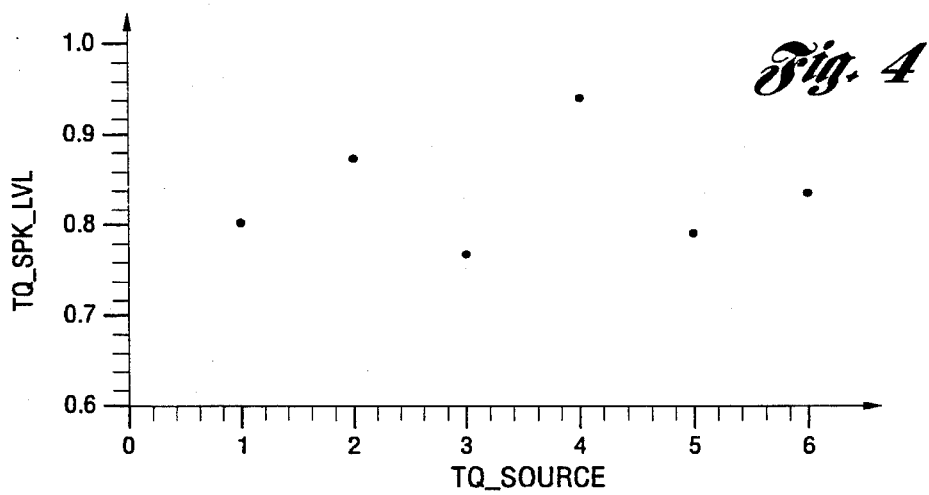
FIG. 4 is a graphical illustration of the relationship between a desired minimum torque ratio due to spark retard and the source of the torque reduction request.

Referring now to FIG. 4, there is shown a graphical illustration of the relationship between TR_SPK_LVL and TQ_SOURCE, wherein a TQ_SOURCE of 0= no torque reduction request; TQ_SOURCE of 1= TTL; TQ_SOURCE of 2= TCTL; TQ_SOURCE of 3= VSL; TQ_SOURCE of 4= ESL; TQ_SOURCE of 5= TITL; and TQ_SOURCE of 6= TOTL. For example, a TR_SPK_LVL of 0.9 corresponds to 10% reduction by spark retard. Also at step 78, the number of cylinders eligible to be fueled is determined, since there is no over-temperature condition.

Referring now to FIG. 3b, at step 80 the ECU determines a ratio of desired indicated torque over current indicated torque. The indicated torque is based on the desired net torque (TQ_MAX_ALLOW) and losses:

$$tr\_des = \frac{TQ\_MAX\_ALLOW + TQ\_LOSS}{TQ\_MBT} \quad (1)$$

This ratio (tr_des) is then preferably utilized to determine the appropriate control action at step 82, wherein tr_des is compared to TR_SPK_LVL. If tr_des is less than TR_SPK_LVL, then the reduction to the desired net torque cannot be achieved by spark retard alone and the state of a flag (INJ_FLG) is modified accordingly at step 84. If tr_des exceeds TR_SPK_LVL, a torque ratio hysteresis is utilized at step 86. The value of the hysteresis adder, which is preferably added to TR_SPK_LVL prior to the comparison with tr_des, is set such that once engine cylinders are defueled, they remain defueled until a sizable increase in torque, such as 6% of a cylinder's torque output (for a V8), is detected. At step 88, the INJ_FLG is cleared.

Figure 5:
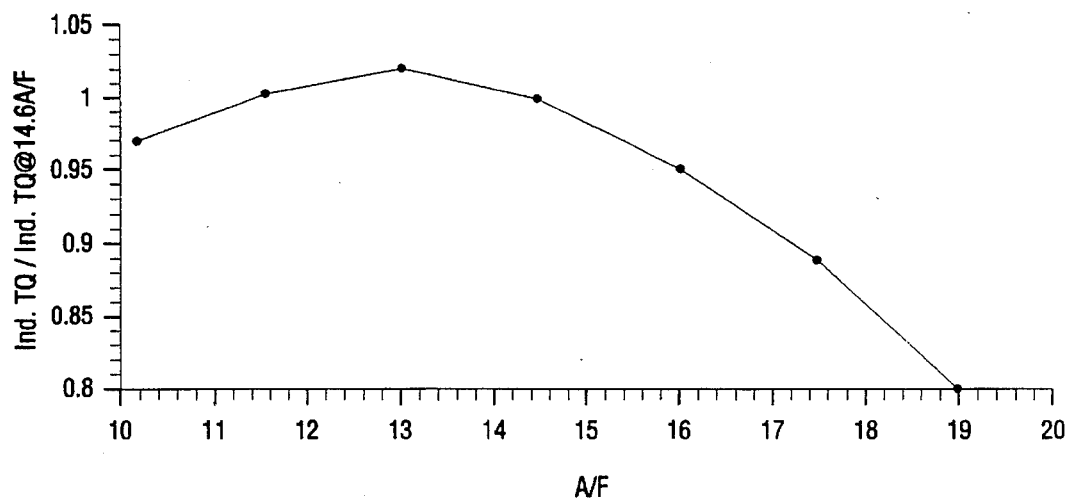
FIG. 5 is a graphical representation of the function which relates spark offset from MBT to a torque ratio.

With continuing reference to FIG. 3b, at step 90 the ECU checks the state of the INJ_FLG. If spark retard alone is sufficient to achieve the desired torque, control flow proceeds to step 92, wherein all cylinders are fueled and the ECU determines the torque reduction as a ratio to be performed by spark retard as follows:

$$SPK\_TQ\_RATIO = tr\_des/INJ\_TR/FUNC623(DES\_LAMBSE) \quad (2)$$

wherein FUNC623(DES_LAMBSE) represents an engine torque multiplier as a function of A/F ratio. More particularly, FUNC623, shown graphically in FIG. 5, relates the effect of A/F on indicated torque. For purposes of step 92, A/F is input to the function, which outputs a torque ratio (indicated torque over indicated torque at 14.6). As shown, FUNC623 is generally bell-shaped, the lean side of which can be inverted to obtain FUNC632, shown in FIG. 6.

As shown in FIG. 3b, if more than spark retard is needed, at step 94 the normal spark advance ($spk_{NRM}$) is determined as follows:

$$spk_{NRM} = min(SPK\_BASE, SPK\_BDL, SPK\_LOW\_LOAD) \quad (3)$$

wherein SPK_BASE represents the desired spark advance for optimal emissions and driveability, SPK_BDL represents borderline detonation spark limit, and SPK_LOW_LOAD represents the idle emissions spark ceiling. At step 96, $SPK_{NRM}$ is utilized to determine the torque ratio that would exist at the normal spark if no torque control actions were required:

$$tr\_exst = FUNC766(SPK\_MBT - spk_{NRM}) \quad (4)$$

wherein SPK_MBT is the spark advance required to achieve maximum brake torque. FUNC766, which is shown graphically in FIG. 7, is a function which relates a spark that is offset, or retarded, from the value required for maximum brake torque and a torque ratio.

Figure 7:
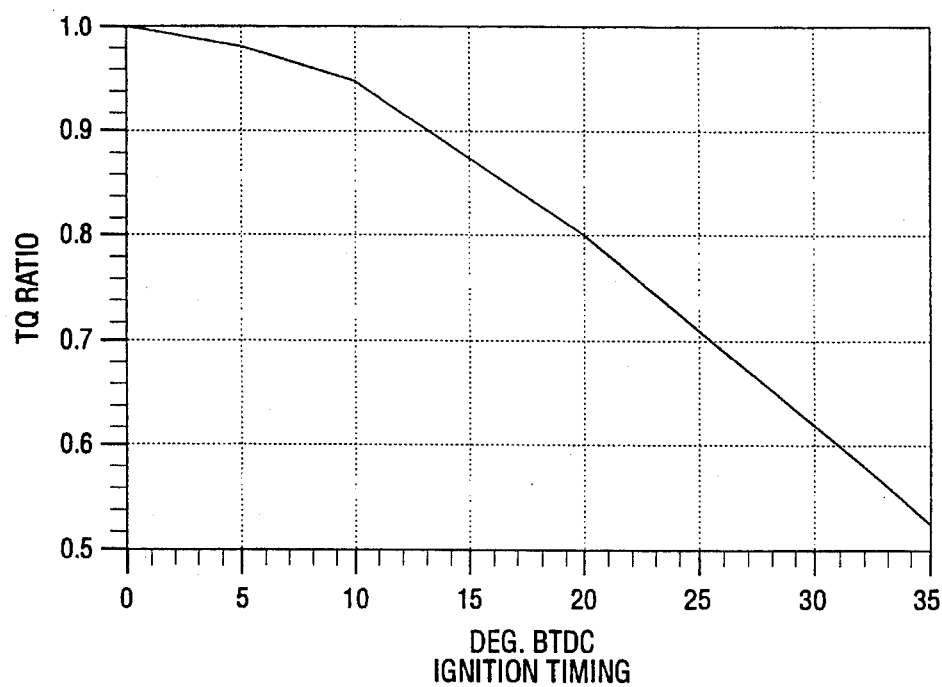
FIG. 7 is a graphical representation of a function which relates the effect of A/F on indicated torque.

As shown in FIG. 7, the input, shown along the horizontal axis, is the amount the spark is retarded from MBT spark, measured in degrees (°). The output, shown along the vertical axis, is the ratio of delivered engine torque at a particular spark advance to the engine torque delivered when the engine is operating at MBT spark. In other words, when the engine is operating at MBT spark, the torque ratio is 1.0 and when the operating point is retarded from MBT spark, the resulting torque ratio will be a dimensionless fractional value, such as 0.80 or 0.90.

This function is described in greater detail in U.S. Pat. No. 5,253,623, assigned to the assignee of the present invention, the specification of which is hereby incorporated by reference in its entirety.

With continuing reference to FIG. 3b, at step 98 the ECU determines the minimum torque ratio required of injector cutout (tr_in_tq). In determining that, the desired torque ratio is adjusted for any reductions already being executed by spark retard and for the minimum reduction expected to be performed by A/F scheduling:

$$tr\_inj\_tq = tr\_des * NUMCYL/tr\_exst/TR\_LAM\_MIN \quad (5)$$

wherein TR_LAM_MIN represents the minimum torque reduction (in terms of a torque ratio) that would be realized due to A/F scheduling, and NUMCYL represents the number of engine cylinders. The result of this calculation is then rounded up to the nearest whole number.

With reference to FIG. 3c, at step 100 the ECU determines the number of engine cylinders to be fueled (INJON) as follows:

$$INJON = min(INJON\_MAX, tr\_inj\_tq) \quad (6)$$

wherein INJON_MAX represents the maximum number of fuel injectors to be energized. Thus, at least INJON_MAX injectors are on for catalyst protection (e.g. controlling catalyst temperatures). At step 102, the ECU determines the torque ratio (INJ_TR) that could be achieved solely by defueling engine cylinders:

$$INJ\_TR = \frac{INJON}{NUMCYL} \quad (7)$$

Thereafter, at step 104 of FIG. 3c, the ECU determines the torque reduction as a ratio to be performed by lean A/F scheduling (TR_AF), adjusting for the number of cylinders already defueled:

$$TR\_AF = tr\_des/INJ\_TR/tr\_exst \quad (8)$$

wherein tr_exst represents the torque available from the existing level of spark.

Figure 6:
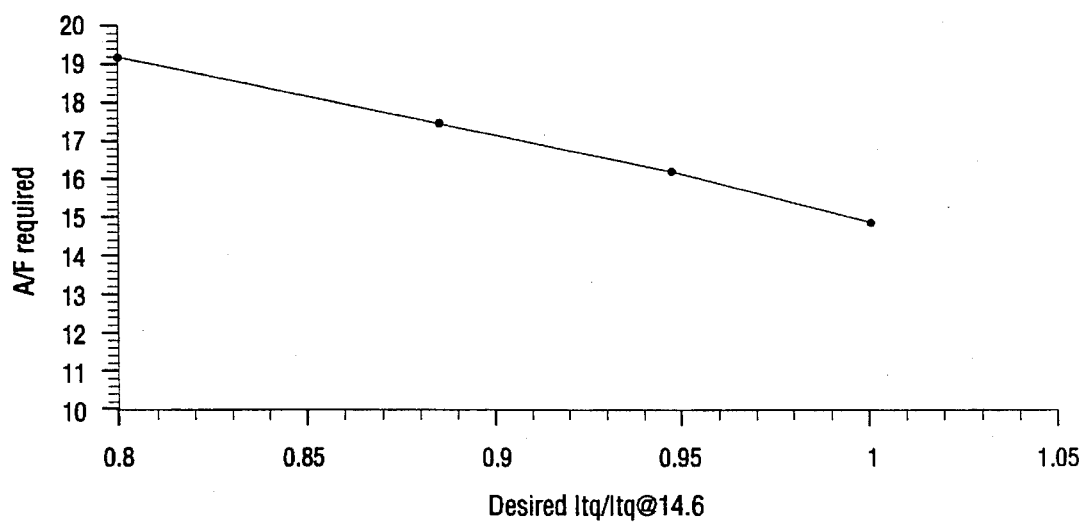
FIG. 6 is a graphical representation of a function which relates the lean A/F required to achieve a given desired torque ratio.
Figure 8:
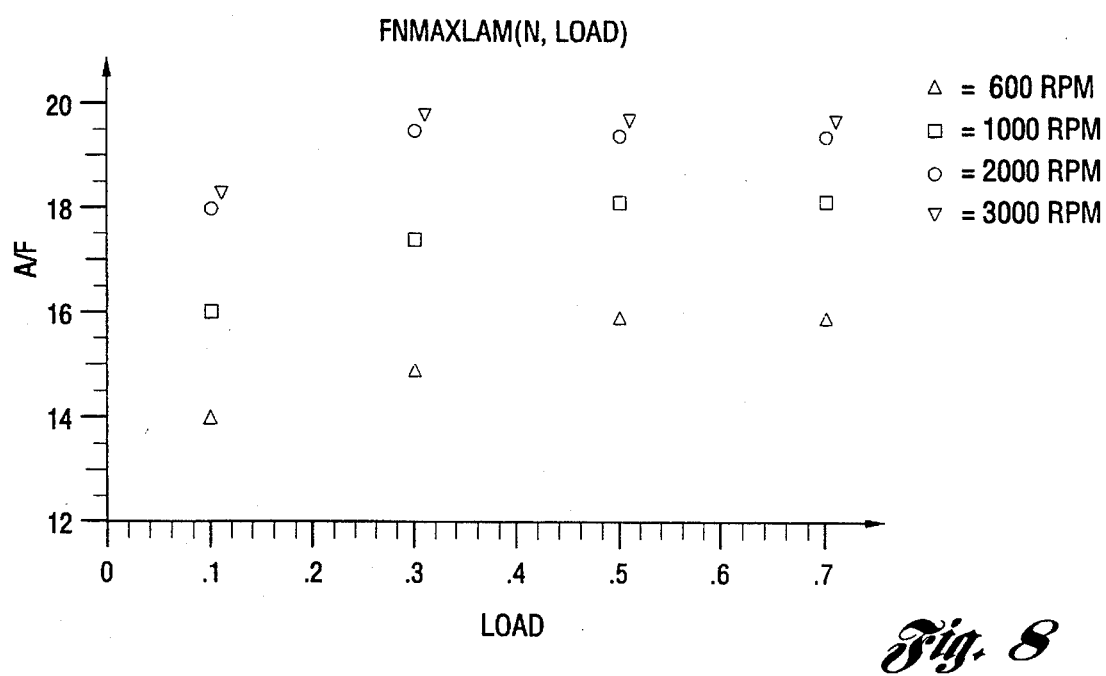
FIG. 8 is a graphical representation of a function which relates A/F and engine load for use with the present invention.

With continuing reference to FIG. 3c, at step 106, the ECU converts the A/F torque ratio into a corresponding A/F ratio (LAM_TQ) to achieve it:

$$LAM\_TQ = FUNC632(TR\_AF) \quad (9)$$

wherein FUNC632, which is shown graphically in FIG. 6, is a function which maps the relationship of a desired torque ratio (desired indicated torque to indicated torque at 14.6) to a lean A/F ratio. It is preferable to maintain an A/F of at least 1.1 during torque reductions, as an A/F of 1.0 or less may be too rich for catalyst temperature reasons. At step 108, this A/F is clipped or limited to the limits of combustion stability as follows:

$$DES\_LAMBSE = \min(LAM\_TQ, FNMAXLAM(N, LOAD)) \quad (10)$$

wherein FNMAXLAM (shown graphically in FIG. 8) is a function which relates A/F to engine load.

At step 110 of FIG. 3c, the ECU determines the torque reduction as a ratio to be performed by spark retard, adjusting for cylinders defueled and for A/F reductions already being performed:

$$SPK\_TQ\_RATIO = tr\_des/INJ\_TR/FUNC623(DES\_LAMBSE) \quad (11)$$

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

What is claimed is:

1. An apparatus for controlling torque output of a spark ignition internal combustion engine having multiple cylinders, an air and fuel mixture flow control and fuel injectors for each of said cylinders, a fuel cut-out control for said injectors and a spark timing control, a microprocessor programmed for establishing control signals to effect responses of said mixture control, said cut-out control and said spark timing control, said microprocessor having means for receiving operating condition sensor output information including mass air flow, engine speed, vehicle speed and throttle position, said microprocessor further having a control unit and memory registers, said memory registers storing control functions and being addressable by said control unit as said control unit operates on said sensor output information:

wherein said microprocessor identifies a desired torque that is the lowest torque to which the engine torque is to be reduced;

wherein said microprocessor determines a first torque reduction to be achieved by defueling at least one of said engine cylinders;

wherein said microprocessor further determines a second torque reduction to be achieved by lean air/fuel scheduling, adjusted for the number of cylinders defueled;

wherein said microprocessor further determines a third torque reduction to be achieved by spark timing retardation, adjusted for the number of cylinders defueled and for the lean air/fuel scheduling, and means for selectively implementing said first, second and third torque reductions so as to reduce the engine torque to said desired engine torque including means for selectively activating said controls for air and fuel mixture flow, said fuel cut-out and said spark timing in accordance with the establishment of predetermined values for said control signals.

2. The apparatus of claim 1 wherein the engine torque being produced is reduced to said desired engine torque solely by retarding the spark advance when the reduction can be achieved solely by spark retard.

3. The apparatus of claim 2 wherein the vehicle includes a catalytic converter through which engine exhaust passes, the apparatus further comprising a catalytic converter temperature sensor, said microprocessor further including means for precluding the use of spark retard to achieve the reduced engine torque when a catalytic converter overtemperature condition exists.

4. The apparatus of claim 2 wherein said microprocessor further includes means for determining whether the desired engine torque can be obtained solely by spark retard.

5. The apparatus of claim 1 wherein the number of cylinders to be fueled is determined according to:

$$INJON = \min(INJON\_MAX, tr\_inj\_tq)$$

wherein INJON_MAX represents the maximum number of fuel injectors to be energized and tr_inj_tq represents the minimum torque ratio required of injector cutout.

6. The apparatus of claim 1 wherein said first torque reduction is determined according to:

$$INJ\_TR = \frac{INJON}{NUMCYL}$$

wherein NUMCYL represents the number of cylinders in the engine.

7. The apparatus of claim 1 wherein said second torque reduction is determined according to:

$$TR\_AF = tr\_des/INJ\_TR/tr\_exst$$

and wherein tr_des represents a ratio of desired indicated torque over current indicated torque, INJ_TR represents a torque ratio that could be achieved solely by defueling engine cylinders, add tr_exst represents the torque available from the existing level of spark.

8. The apparatus of claim 7 wherein said microprocessor further comprises means for converting TR_AF into a corresponding air/fuel ratio utilizing a function which relates torque ratios to air/fuel ratios.

9. The apparatus of claim 8 wherein said microprocessor further comprises means for limiting the corresponding air/fuel ratio to the limits of combustion stability utilizing a function which relates air/fuel to engine load.

10. The apparatus of claim 1 wherein said third torque reduction is determined according to:

$$SPK\_TQ\_RATIO = tr\_des/INJ\_TR/FUNC623(DES\_LAMBSE)$$

wherein FUNC623 (DES_LAMBSE) is a function which relates the effect of A/F on indicated torque.

11. A powertrain control for a wheeled vehicle having traction wheels, a spark ignition, internal combustion engine having multiple cylinders, and a transmission drivably connecting said engine to said traction wheels, an apparatus for controlling torque output of said engine, said engine cylinders having an air and fuel mixture flow control and fuel injectors for each of said cylinders, a fuel cut-out control for said injectors and a spark timing control, a microprocessor means programmed for establishing control signals to effect a response of said mixture flow, said cut-out and said spark timing, said microprocessor having means for receiving operating condition sensor information including mass air flow, engine speed, vehicle speed and throttle position, a control unit and memory registers, said memory registers storing control functions and being addressable by said control unit as said control unit operates on said sensor output information:

wherein said microprocessor identifies a desired torque to which the engine torque is to be reduced;

wherein said microprocessor determines a first torque reduction to be achieved by defueling at least one of the engine cylinders;

wherein said microprocessor further determines a second torque reduction to be achieved by lean air/fuel scheduling, adjusted for the number of cylinders defueled;

wherein said microprocessor further determines a third torque reduction to be achieved by spark timing retardation, said third torque reduction being adjusted for the number of cylinders defueled and for the lean air/fuel scheduling, and means for selectively implementing said first, second and third torque reductions so as to reduce the engine torque to said desired engine torque expressed as a ratio of desired torque to current indicated torque including means for selectively activating said controls for air and fuel mixture flow, said fuel cut-out and said spark timing in accordance with the establishment of predetermined values for said control signals wherein a maximum allowable torque value that effects a predetermined vehicle speed is established, maximum allowable transmission torque is measured, and maximum allowable traction torque is measured;

said microprocessor including means for comparing said maximum allowable torques and for selecting the lowest net engine torque that will result in the lowest of said maximum allowable torques.

12. The apparatus of claim 11 wherein the engine torque being produced is reduced to said desired engine torque solely by retarding the spark advance when the reduction can be achieved solely by spark retardation.

13. The apparatus of claim 12 wherein the vehicle includes a catalytic converter through which engine exhaust passes and a catalytic converter temperature sensor, said microprocessor including further means for precluding the use of spark retard to achieve the reduced engine torque when a catalytic converter exhaust over-temperature condition exists.

14. The apparatus of claim 11 wherein the first torque reduction is determined according to:

$$INJ\_TR = \frac{INJON}{NUMCYL}$$

wherein INJ_ON represents the number of cylinders to be fueled and NUMCYL represents the number of cylinders in the engine.

15. The apparatus of claim 11 wherein said second torque reduction is determined according to:

$$TR\_AF = tr\_des/INJ\_TR/tr\_exst$$

and wherein tr_des represents a ratio of desired indicated torque over current indicated torque, INJ_TR represents a torque ratio that could be achieved solely by defueling engine cylinders, and tr_exst represents the torque available from the existing level of spark.

16. The apparatus of claim 11 wherein said third torque reduction is determined according to:

$$SPK\_TQ\_RATIO = tr\_des/INJ\_TR/FUNC623 (DES\_LAMBSE)$$

and wherein FUNC623(DES_LAMBSE) is a function which relates the effect of A/F on indicated torque.

17. The apparatus set forth in claim 11 wherein said vehicle includes a catalytic exhaust system with an exhaust gas emission catalyst effective to reduce concentration of exhaust gas emission components, means for selectively implementing said first, second and third torque reductions including means for monitoring the operating temperature of said catalyst and disabling selected ones of said controls wherein over-temperature operation of said catalytic exhaust systems is avoided.

\* \* \* \* \*